(12) United States Patent     (10) Patent No.:   US 12,625,572 B2
    Kadowaki     (45) Date of Patent:    May 12, 2026

(54) SENSOR PANEL

(71) Applicant: Wacom Co., Ltd., Saitama (JP)

(72) Inventor: Jun Kadowaki, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/957,505

(22) Filed: Nov. 22, 2024

(65) Prior Publication Data

US 2025/0085793 A1     Mar. 13, 2025

Related U.S. Application Data

(63) Continuation of application No. 18/333,390, filed on Jun. 12, 2023, now Pat. No. 12,175,027, which is a
(Continued)

(30) Foreign Application Priority Data

Feb. 26, 2018    (JP) ................................. 2018-032346

(51) Int. Cl.
    *G06F 3/0354*     (2013.01)
    *G06F 3/041*     (2006.01)
    *G06F 3/044*     (2006.01)
(52) U.S. Cl.
    CPC ........ *G06F 3/03545* (2013.01); *G06F 3/0412* (2013.01); *G06F 3/04164* (2019.05);
(Continued)
(58) Field of Classification Search
    CPC ............... G06F 3/03545; G06F 3/0412; G06F 3/04164; G06F 3/0418; G06F 3/044;
(Continued)

(56) References Cited

U.S. PATENT DOCUMENTS 8,659,586 B2   2/2014   Kadowaki
2008/0129317 A1*   6/2008   Oba ...................... G06F 3/0445
                                 324/663
(Continued)

FOREIGN PATENT DOCUMENTS

CN     104516561 A     4/2015
CN     106662942 A     5/2017
(Continued)

OTHER PUBLICATIONS

Chinese Office Action dated Oct. 24, 2023, for the corresponding Chinese Patent Application No. 201811548761.5, 18 pages. (with English translation).
(Continued)

*Primary Examiner* — Christopher E Leiby
(74) *Attorney, Agent, or Firm* — Seed Intellectual Property Law Group LLP

(57) ABSTRACT

A sensor panel is overlaid on a display apparatus and connected to an integrated circuit that detects a position of an active pen in an active region of the display apparatus. The sensor panel includes first electrodes that extend in a first direction. The sensor panel also includes second electrodes that extend in a second direction. The first electrodes include first and second outer electrodes that are located at the outermost edges of the first electrodes and first inner electrodes disposed between the first and second outer electrodes. A width of at least one of the first and second outer electrodes in the second direction is smaller than a width of each of the first inner electrodes in the second direction.

3 Claims, 8 Drawing Sheets

Related U.S. Application Data continuation of application No. 17/747,860, filed on May 18, 2022, now Pat. No. 11,698,689, which is a continuation of application No. 17/063,611, filed on Oct. 5, 2020, now Pat. No. 11,360,581, which is a continuation of application No. 16/219,549, filed on Dec. 13, 2018, now Pat. No. 10,795,461.

(60) Provisional application No. 62/615,589, filed on Jan. 10, 2018.

(52) U.S. Cl.
CPC ............ *G06F 3/0418* (2013.01); *G06F 3/044* (2013.01); *G06F 3/0442* (2019.05); *G06F 3/0445* (2019.05); *G06F 3/0446* (2019.05); *G06F 2203/04112* (2013.01)

(58) Field of Classification Search
CPC .... G06F 3/0442; G06F 3/0445; G06F 3/0446; G06F 2203/04112
See application file for complete search history.

(56) References Cited

U.S. PATENT DOCUMENTS

| | | | |
|---|---|---|---|
| 2009/0109369 A1 | 4/2009 | Morishita | |
| 2011/0057893 A1 | 3/2011 | Kim et al. | |
| 2011/0193801 A1 | 8/2011 | Jung et al. | |
| 2011/0227858 A1 | 9/2011 | An et al. | |
| 2011/0316803 A1 | 12/2011 | Kim | |
| 2012/0182254 A1 | 7/2012 | Jang et al. | |
| 2012/0235691 A1 | 9/2012 | Ho et al. | |
| 2012/0306776 A1 | 12/2012 | Kim et al. | |
| 2013/0321003 A1* | 12/2013 | Shimizu | G06F 3/0443 324/663 |
| 2014/0028626 A1 | 1/2014 | Maeda et al. | |
| 2014/0191978 A1 | 7/2014 | Ng et al. | |
| 2014/0225839 A1 | 8/2014 | Dunphy et al. | |
| 2014/0327842 A1 | 11/2014 | Tang et al. | |
| 2015/0022736 A1 | 1/2015 | Kim et al. | |
| 2015/0028897 A1 | 1/2015 | Koo et al. | |
| 2015/0070309 A1 | 3/2015 | Kang | |
| 2015/0092359 A1 | 4/2015 | Kim et al. | |
| 2015/0185940 A1 | 7/2015 | Han et al. | |
| 2015/0193065 A1 | 7/2015 | Hsieh | |
| 2015/0220193 A1 | 8/2015 | Choe et al. | |
| 2016/0026298 A1 | 1/2016 | Hashida et al. | |
| 2016/0154517 A1 | 6/2016 | Ullmann et al. | |
| 2016/0179249 A1 | 6/2016 | Ballan et al. | |
| 2016/0306497 A1 | 10/2016 | Nagai et al. | |
| 2016/0370944 A1 | 12/2016 | Zhao et al. | |
| 2017/0131811 A1 | 5/2017 | Watanabe et al. | |
| 2017/0139512 A1 | 5/2017 | Kim et al. | |
| 2017/0220163 A1 | 8/2017 | Kurasawa et al. | |
| 2017/0308202 A1 | 10/2017 | Fang et al. | |
| 2018/0046272 A1* | 2/2018 | Hara | G06F 3/0383 |
| 2018/0052552 A1 | 2/2018 | Tsai | |
| 2018/0067584 A1 | 3/2018 | Zhu et al. | |
| 2018/0120992 A1 | 5/2018 | Lee | |
| 2018/0267660 A1 | 9/2018 | Shepelev et al. | |
| 2018/0329554 A1 | 11/2018 | Beak et al. | |
| 2019/0004657 A1* | 1/2019 | Koudo | G06F 3/047 |
| 2019/0025969 A1 | 1/2019 | Liu et al. | |
| 2019/0102011 A1 | 4/2019 | Schultz et al. | |
| 2019/0227650 A1 | 7/2019 | Fang et al. | |
| 2020/0089343 A1 | 3/2020 | Kadowaki et al. | |
| 2020/0142542 A1 | 5/2020 | Kuriki et al. | |

FOREIGN PATENT DOCUMENTS

| | | | |
|---|---|---|---|
| JP | 2013058262 A | 3/2013 | |
| JP | 2014063249 A | 4/2014 | |
| JP | 2014186687 A | 10/2014 | |
| JP | 2015035205 A | 2/2015 | |
| JP | 2016528602 A | 9/2016 | |
| JP | 2016206803 A | 12/2016 | |
| JP | 2017091018 A | 5/2017 | |

OTHER PUBLICATIONS

Japanese Notice of Reasons for Refusal, dated Jan. 11, 2022, for Japanese Application No. 2018-032346, 10 pages. (with English translation).

Japanese Notice of Reasons for Refusal, dated May 2, 2023, for Japanese Application No. 222-066137, 8 pages. (with English translation).

* cited by examiner

SENSOR PANEL

BACKGROUND

Technical Field

The present technology relates to a sensor panel and particularly to a sensor panel overlaid on a display apparatus for use.

Background Art

In tablet electronic equipment with a function to detect finger and stylus positions, a sensor panel is placed over a display panel. The sensor panel has a plurality of linear electrodes. The linear electrodes include, in a region overlapping an active region (display region) of the display panel, a plurality of x electrodes that extend in a y direction and that are arranged at regular intervals in an x direction and a plurality of y electrodes that extend in the x direction and that are arranged at regular intervals in the y direction. These electrodes are connected to an integrated circuit (sensor controller) that detects fingers and styluses via a plurality of wires and a plurality of FPC (Flexible Printed Circuits) connection terminals provided in a region overlapping a bezel region of the display panel.

An active pen is known as a type of stylus. An active pen is a stylus that includes a power supply section and a signal processing circuit and that is configured to be able to send a pen signal by supplying charge proportional to a signal generated by the signal processing circuit to an electrode provided near a pen tip (pen electrode). During detection of the active pen, of the plurality of linear electrodes provided in the sensor panel, the one near the pen tip detects a pen signal and supplies the pen signal to the sensor controller via the above FPC connection terminal. The sensor controller determines an X coordinate of the active pen on the basis of the reception level of the pen signal in each x electrode and a y coordinate of the active pen on the basis of the reception level of the pen signal in each y electrode, thereby detecting the active pen position in a touch surface.

Japanese Patent Laid-open No. 2014-063249 discloses a position detector capable of detecting both fingers and active pens.

However, in the case where the sensor panel is overlaid on the display apparatus as described above, the area of the portion of the sensor panel provided outside the active region may increase. This hinders bezel slimming, an ongoing trend in recent years, which is the reason why improvement may be needed.

BRIEF SUMMARY

It is desirable to provide a sensor panel that realizes bezel slimming in tablet electronic equipment.

A sensor panel according to a first embodiment of the present disclosure is a sensor panel overlaid on a display apparatus and connected to an integrated circuit that detects a position of an active pen in an active region of the display apparatus. The sensor panel includes a plurality of first electrodes that extend in a first direction, wherein the first electrodes are arranged side by side in a second direction different from the first direction, and are connected to the integrated circuit by a plurality first routing wires that are different from each other. The sensor panel also includes a plurality of second electrodes that extend in the second direction, wherein the second electrodes are arranged side by side in the first direction, and that are connected to the integrated circuit by a plurality second routing wires that are different from each other. The plurality of first electrodes include first and second outer electrodes that are located at outermost edges of the first electrodes and a plurality of first inner electrodes disposed between the first and second outer electrodes. A width of at least one of the first and second outer electrodes in the second direction is smaller than a width of each of the first inner electrodes in the second direction.

A sensor panel according to a second embodiment of the present disclosure is a sensor panel overlaid on a display apparatus and connected to an integrated circuit that detects the position of an active pen in an active region of the display apparatus. The sensor panel includes a plurality of first electrodes that extend in a first direction, wherein the first electrodes are arranged side by side in a second direction different from the first direction, and are connected to the integrated circuit by a plurality first routing wires that are different from each other. The sensor panel also includes a plurality of second electrodes that extend in the second direction, wherein the second electrodes are arranged side by side in the first direction, and are connected to the integrated circuit by a plurality second routing wires that are different from each other. At least one of first and second outer electrodes that are located at the outermost edges of the first electrodes includes a first cover section that covers at least one of the second routing wires.

A sensor panel according to a third embodiment of the present disclosure is a sensor panel overlaid on a display apparatus for use and at least connected to an integrated circuit that detects the position of an active pen in an active region of the display apparatus. The sensor panel includes a plurality of first electrodes that extend in a first direction, wherein the first electrodes are arranged side by side in a second direction different from the first direction, and are connected to the integrated circuit by a plurality first routing wires that are different from each other. The sensor panel also includes a plurality of second electrodes that extend in the second direction, wherein the second electrodes are arranged side by side in the first direction, and are connected to the integrated circuit by a plurality second routing wires that are different from each other. The first electrodes include first and second outer electrodes that are located at the outermost edges of the first electrodes and a plurality of first inner electrodes disposed between the first and second outer electrodes. At least one of the first and second outer electrodes includes a mesh-shaped conductor that is formed such that a mesh density outside the active region is higher than the mesh density inside the active region.

The first and third embodiments of the present disclosure reduce the width of a portion of at least one of the first and second outer electrodes provided outside the active region, thereby reducing the area of a portion of the sensor panel provided outside the active region. As a result, bezel slimming may be realized in tablet electronic equipment.

In the second embodiment of the present disclosure, one of the first and second outer electrodes is arranged over the second routing wires, thereby reducing the area of the portion of the sensor panel provided outside the active region. As a result, bezel slimming may be realized in tablet electronic equipment.

DETAILED DESCRIPTION OF THE PREFERRED EMBODIMENTS

A detailed description will be given below of embodiments of the present technology with reference to the attached drawings.

Figure 1:
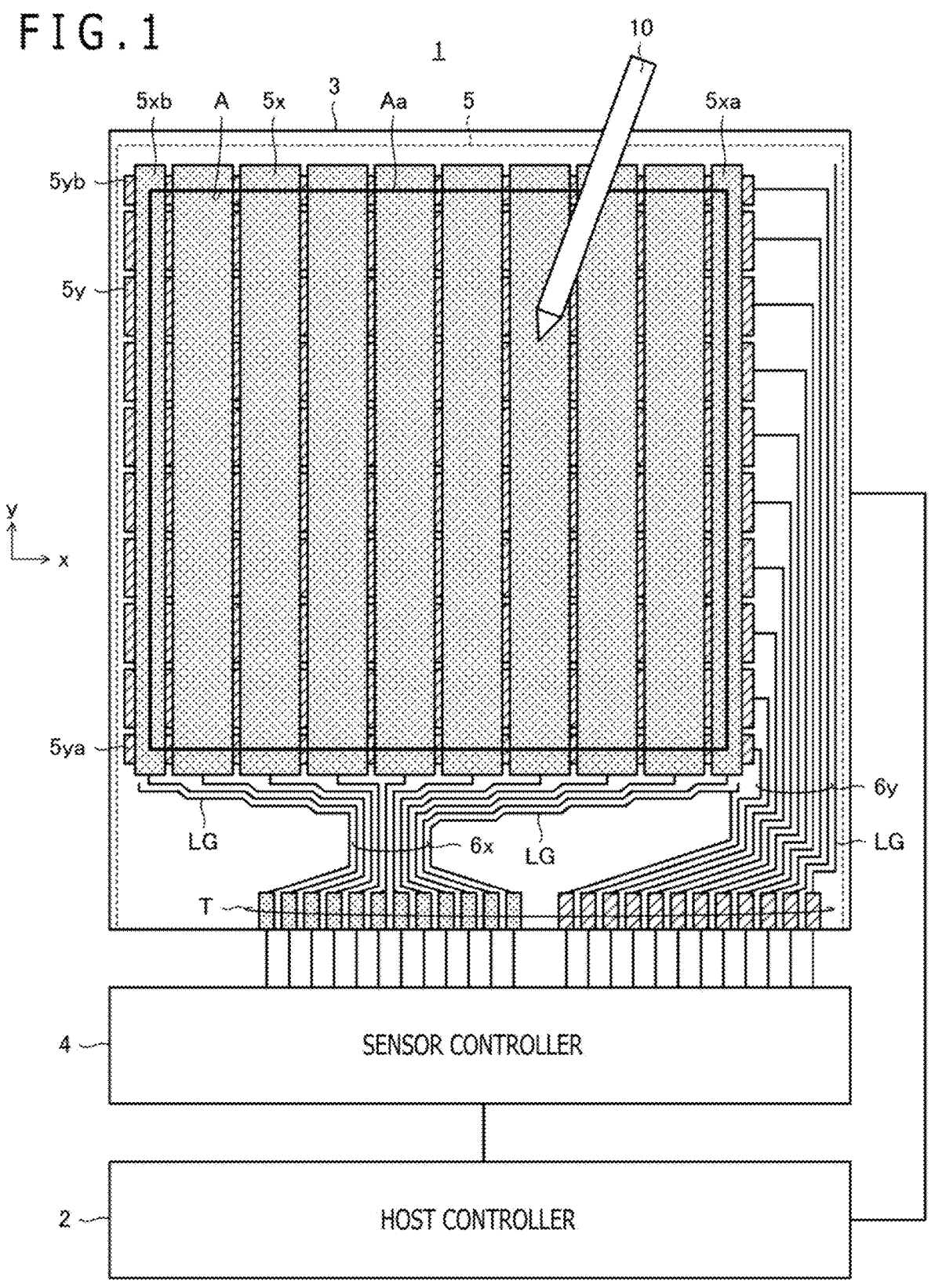
FIG. 1 is a schematic diagram illustrating configurations of electronic equipment 1 and an active pen 10 according to a first embodiment of the present disclosure.
Figure 2:
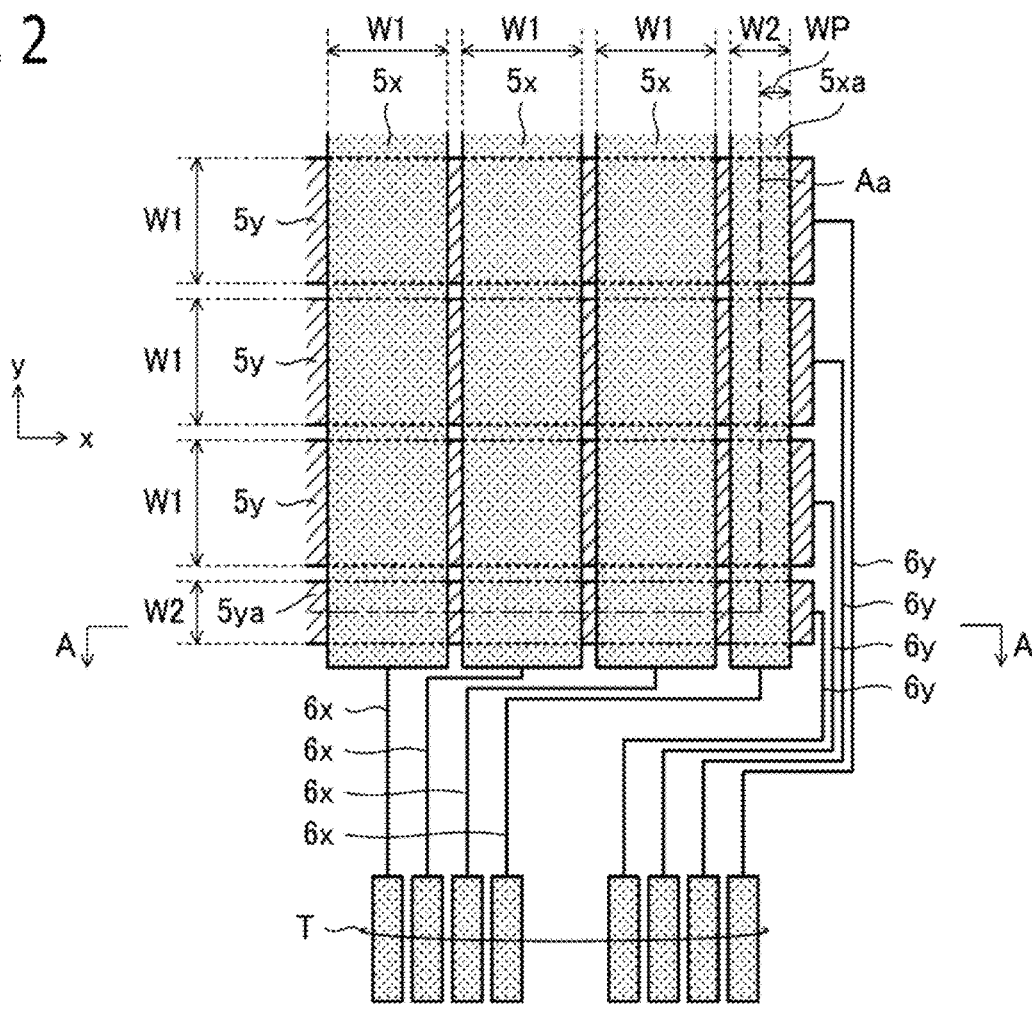
FIG. 2 is a schematic enlarged view of part of a sensor panel 5 illustrated in FIG. 1.
Figure 3:
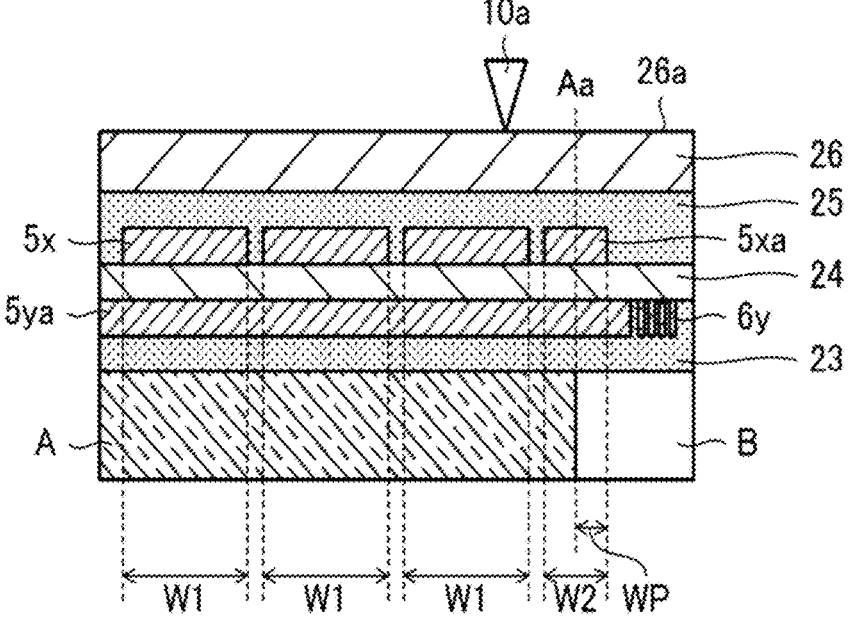
FIG. 3 is a schematic cross-sectional view of the electronic equipment 1 corresponding to line A-A illustrated in FIG. 2.

FIG. 1 is a diagram illustrating configurations of electronic equipment 1 and an active pen 10 according to a first embodiment of the present technology. FIG. 2 is a schematic enlarged view of part of a sensor panel 5 illustrated in FIG. 1. FIG. 3 is a schematic cross-sectional view of the electronic equipment 1 corresponding to line A-A illustrated in FIG. 2. FIGS. 2 and 3 are schematic diagrams and do not necessarily match FIG. 1.

The electronic equipment 1 according to the present embodiment is, for example, a tablet computer and includes a host controller 2, a display panel 3 (display apparatus), a sensor controller 4, and the sensor panel 5 as illustrated in FIG. 1.

The host controller 2 is a computer having a processor and a memory (both not depicted), and the processor reads and executes the program stored in the memory, thereby performing a variety of processing tasks such as controlling different sections of the electronic equipment 1 including the display panel 3 and the sensor controller 4 illustrated and executing various applications including a drawing application. The memory includes a main memory such as DRAM (Dynamic Random Access Memory) and an auxiliary storage apparatus such as flash memory.

The display panel 3 includes an active region A and a bezel region B as illustrated in FIG. 3. The active region A is a rectangular region with a plurality of pixels (not depicted) arranged therein in a matrix form. A drive circuit (not depicted) provided in the display panel 3 achieves arbitrary display in the active region A by driving each pixel under control of the host controller 2. The bezel region B is a belt-shaped region provided between an outer periphery Aa of the active region A and an outer edge of the display panel 3. The bezel region B has the above drive circuit and wires (not depicted) for connecting each of the pixels in the active region A to the drive circuit provided therein. Specific examples of the display panel 3 are a liquid crystal display, an organic electroluminescence (EL) display, and an electronic paper.

The sensor controller 4 and the sensor panel 5 are input apparatuses to the host controller 2. Of these, the sensor controller 4 is an integrated circuit (IC) for detecting the position of the active pen 10 and a user's finger (not depicted) at least inside the active region of the display panel 3. The sensor controller 4 may detect the positions of the active pen 10 and the user's finger not only inside but also outside the active region A. The finger position detection function of the sensor controller 4 may not be needed. The sensor panel 5 is overlaid on the display panel 3 for use and connected to the sensor controller 4.

Describing in detail the sensor panel 5 first, the sensor panel 5 includes a plurality of linear electrodes 5*x*, a plurality of linear electrodes 5*y*, a plurality of wires 6*x*, and a plurality of wires 6*y* illustrated in FIGS. 1 to 3, a plurality of guard wires LG illustrated in FIG. 1, an adhesive sheet 23, film 24, an adhesive sheet 25, and cover glass 26 illustrated in FIG. 3.

Figure 10:
FIG. 10 is a schematic enlarged view of part of the sensor panel 5 according to a third embodiment of the present disclosure.
Figure 10:
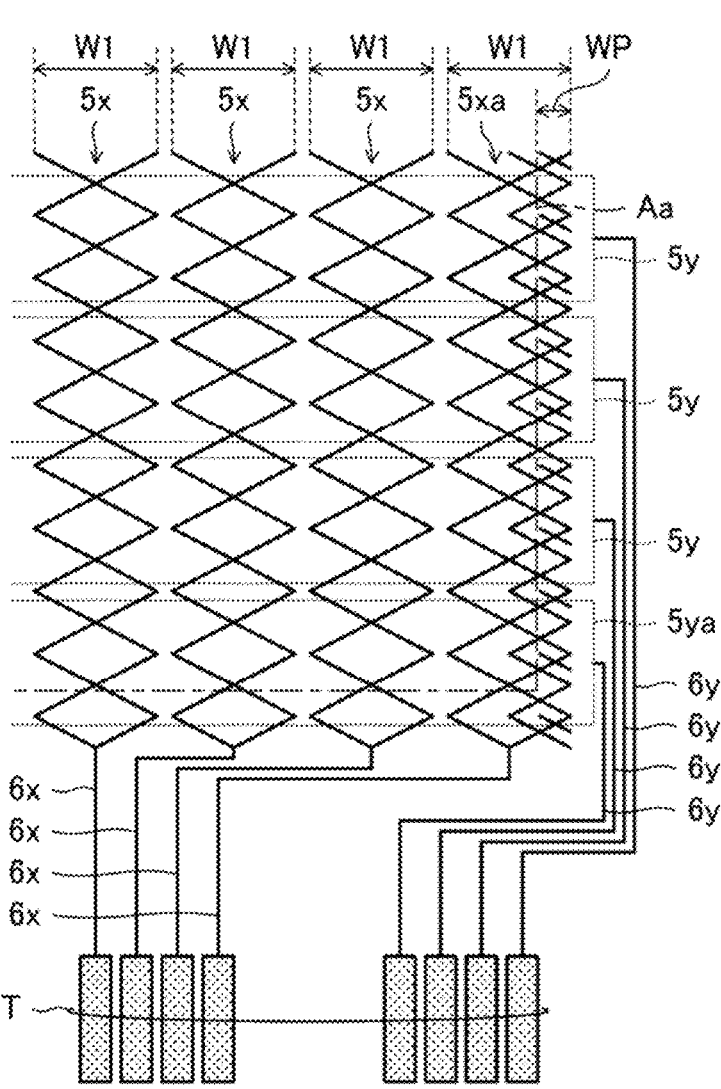
Figures 11, 12:
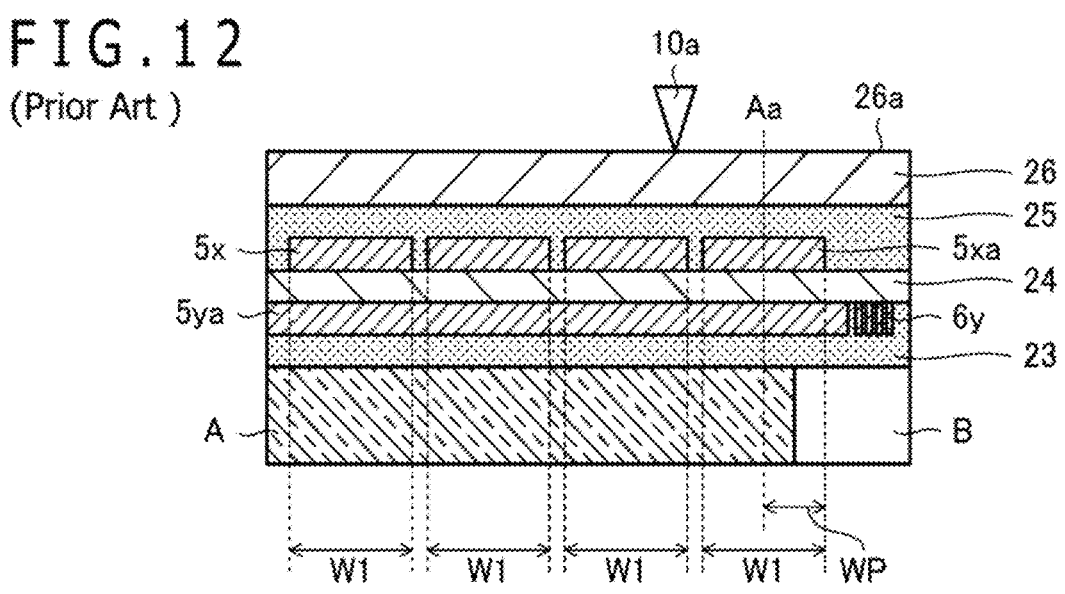
FIG. 11 is a schematic enlarged view of part of the sensor panel 5 according to a background technology of the present disclosure.
FIG. 12 is a schematic cross-sectional view of the electronic equipment 1 corresponding to line C-C illustrated in FIG. 11.

Each of the plurality of linear electrodes 5*x* and the plurality of linear electrodes 5*y* is a plate- or mesh-shaped conductor. In the case where the plurality of linear electrodes 5*x* and the plurality of linear electrodes 5*y* are mesh-shaped conductors, the shape illustrated in FIG. 1 and other figures depicts an outer shape as a whole, and the shape and layout of the linear electrodes 5*x* and 5*y* which will be described below applies to this outer shape. FIGS. 10 and 11 which will be described later specifically illustrate examples of mesh-shaped conductors.

The plurality of linear electrodes 5*x* (first electrodes) extend in a y direction (first direction) and are arranged side by side in an x direction orthogonal to the y direction (second direction different from the first direction) as illustrated in FIG. 1. In the description given below, of the plurality of linear electrodes 5*x*, two electrodes that are located at the outermost edges may be referred to as an outer electrode 5*xa* and an outer electrode 5*xb* (first and second outer electrodes), respectively, while other linear electrodes 5*x* may be referred to as inner electrodes 5*x* (first inner electrodes) for purposes of distinction. Each of the outer electrode 5*xa* and the outer electrode 5*xb* is provided where it covers the outer periphery Aa of the active region A. The linear electrodes 5*x* are connected to the sensor controller 4 via the different wires 6*x* (first routing wires) and the different FPC connection terminals T.

The plurality of linear electrodes 5*y* (second electrodes) extend in the x direction and are arranged side by side in the y direction as illustrated in FIG. 1. In the description given below, of the plurality of linear electrodes 5*y*, two electrodes that are located at the outermost edges may be referred to as an outer electrode 5*ya* and an outer electrode 5*yb* (third and fourth outer electrodes), while other linear electrodes 5*y* may be referred to as inner electrodes 5*y* (second inner electrodes) for purposes of distinction. Each of the outer electrode 5*ya* and the outer electrode 5*yb* is provided where it covers the outer periphery Aa of the active region A. The linear electrodes 5*y* are connected to the sensor controller 4 via the different wires 6*y* (second routing wires) and the different FPC connection terminals T. Although all the linear electrodes $5y$ are connected to the wires $6y$ on the same side in FIGS. 1 and 2 and the figures which will be discussed later, the linear electrodes $5y$ may be connected to the wires $6y$ alternately on the right and left in the figure from the outer electrode $5ya$ to the outer electrode $5yb$.

The plurality of guard wires LG ensure insulation between the plurality of wires $6x$ and the plurality of wires $6y$ and are arranged in such a manner as to sandwich the plurality of wires $6x$ and the plurality of wires $6y$ on both sides as illustrated in FIG. 1. Each of the plurality of guard wires LG is also connected to the sensor controller 4 via the corresponding FPC connection terminal T. The sensor controller 4 is configured to supply a specific potential such as ground potential to each of the guard wires LG.

The plurality of guard wires LG may not be needed. The plurality of guard wires LG may be linear conductors or mesh-shaped conductors. The guard wires LG may be used to detect whether a pen exists at a bezel position.

The adhesive sheet 23, the film 24, the adhesive sheet 25, and the cover glass 26 are stacked in this order from the side close to the display panel 3 as illustrated in FIG. 3. The adhesive sheets 23 and 25 include a clear adhesive compound such as OCA (Optical Clear Adhesive) or OCR (Optical Clear Resin). The plurality of linear electrodes $5x$, the plurality of wires $6x$, the plurality of guard wires LG, and the plurality of FPC connection terminals T each connected to one of the plurality of wires $6x$ and one of the plurality of guard wires LG, are arranged on a top surface (surface on the side of the cover glass 26) of the film 24. The adhesive tape 25 fastens these to the film 24. The plurality of linear electrodes $5y$, the plurality of wires $6y$, the plurality of guard wires LG, and the plurality of FPC connection terminals T each connected to one of the plurality of wires $6y$ and one of the plurality of guard wires LG, are arranged on a bottom surface of the film 24. The adhesive tape 23 fastens these to the film 24. If necessary, the wires formed on the top surface of the film 24 and those formed on the bottom surface of the film 24 may be connected to each other by via electrodes that penetrate the film 24. The plurality of FPC connection terminals T are arranged side by side along one side of the rectangular sensor panel 5 parallel to the x direction as illustrated in FIG. 1.

The top surface of the cover glass 26 is included in a touch surface $26a$, a surface to be touched with a pen tip $10a$ of an active pen 10 or a user's finger (not depicted). At least in the region overlapping the active region A, each component member of the sensor panel 5 including this cover glass 26 includes a clear material or a non-clear material whose arrangement density is designed to permit passage of light therethrough such that the user may see an image appearing in the active region A through the sensor panel 5.

Next, the sensor controller 4 has a processor and a memory (both not depicted) and is provided on a flexible printed circuit (FPC) board or a rigid board which is not depicted. The board on which the sensor controller 4 is provided is crimped to the plurality of FPC connection terminals T arranged inside a wiring region of the sensor panel 5. As a result, the sensor controller 4 and each of the wires in the sensor panel 5 are electrically connected through this crimping.

The sensor controller 4 is functionally configured to detect a pointing position of the active pen 10 and the user's finger (not depicted) on the touch surface $26a$ and receive a data signal from the active pen 10 as a result of reading and execution of the program stored in the memory by the processor. The detection of the pointing position of the active pen 10 is achieved by an active capacitive coupling scheme. On the other hand, the detection of the pointing position of the user's finger is achieved by a capacitive scheme.

The capacitive sensing scheme acquires the pointing position of the user's finger on the basis of a change in capacitance that takes place between the plurality of linear electrodes $5x$ and $5y$ and the user's finger. In the case of position detection through the capacitive sensing scheme, the sensor controller 4 sequentially supplies a given detection signal to each of the linear electrodes $5x$ and measures the potential of each of the plurality of linear electrodes $5y$ each time the detection signal is supplied. In the case where the user's finger approaches an intersection between one of the linear electrodes $5x$ and one of the linear electrodes $5y$, part of a current flowing from the linear electrode $5x$ to the linear electrode $5y$ flows toward the user's body, thereby resulting in a lower potential measured for the linear electrode $5y$. The sensor controller 4 detects the pointing position by taking advantage of this change in potential.

The active capacitive coupling scheme receives, with the sensor panel 5, a pen signal sent from the active pen 10 and detects, on the basis of the result thereof, the pointing position of the active pen 10. The pen signal includes a position signal, an unmodulated burst signal, and a data signal indicating a variety of types of data regarding the active pen 10. The variety of types of data includes pen pressure data indicating the pressure applied to the pen tip $10a$ of the active pen 10 and other data. The active pen 10 may send a pen signal in response to the reception of an uplink signal sent from the sensor controller 4 via the linear electrodes $5x$ and $5y$. In this case, the active pen 10 preferably determines specific contents of data to be sent in a data signal in accordance with a command included in the uplink signal.

In the case of detection of a pointing position by the active capacitive coupling scheme, the sensor controller 4 receives a position signal with each of the plurality of linear electrodes $5x$ and $5y$ and detects the pointing position of the active pen 10 on the basis of the result thereof. A detailed description will be given later of the specific detection method. The sensor controller 4 detects the data signal sent from the active pen 10 by using, of all the plurality of linear electrodes $5x$ and $5y$, the ones closest to the detected pointing position.

Figure 4:
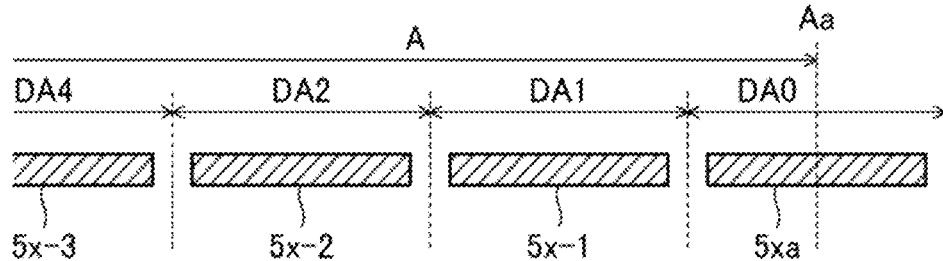
FIG. 4 is a diagram describing detection of a pointing position through an active capacitive coupling scheme.

FIG. 4 is a diagram describing detection of a pointing position through an active capacitive coupling scheme. A description will be given below of the case in which, of the sensor panel, the area of the portion installed outside the active region is large will be described with reference to FIG. 4. The pointing position detection method itself which will be described below was devised by the present inventor and is not publicly known at the time of the priority date of the present application.

FIG. 4 illustrates the outer electrode $5xa$ and three inner electrodes $5x$-1 to $5x$-3 in order from the side closer to the outer electrode $5xa$. Although a description will be given below with focus on these four electrodes, the same is true for other linear electrodes $5x$ and $5y$.

A region DA0 illustrated in FIG. 4 depicts the region with the maximum position signal reception strength on the outer electrode $5xa$. The same is true for regions DA1 to DA3 which depict the regions with the maximum position signal reception strengths on the inner electrodes $5x$-1 to $5x$-3, respectively.

In the case where the pen tip $10a$ of the active pen 10 is located inside the region DA1, the sensor controller 4 detects the x coordinate of the pen tip 10*a* by referring to not only the reception strength of the position signal received by the inner electrode 5*x*-1 but also those of the position signal received by the two adjacent linear electrodes thereof, i.e., the outer electrode 5*xa* and the inner electrode 5*x*-2. Specifically, the sensor controller 4 decides, on the basis of the reception strength on the inner electrode 5*x*-1, whether the pen tip 10*a* is on a center line of the inner electrode 5*x*-1 in the x direction or slightly off the center line in the x direction. This decision takes advantage of the property of reception strength which decreases with increase in distance of the pen tip 10*a* from the center line in the x direction.

In the case where the former is found to be true by the decision, the sensor controller 4 determines the x coordinate of the center line of the inner electrode 5*x*-1 in the x direction as the x coordinate of the pen tip 10*a*. On the other hand, in the case where the latter is found to be true by the decision, the sensor controller 4 decides, on the basis of the ratio between the reception strength on the outer electrode 5*xa* and that on the inner electrode 5*x*-2, the direction of discrepancy, i.e., whether the pen tip 10*a* is off the center line toward the outer electrode 5*xa* or toward the inner electrode 5*x*-2, and, next, decides, on the basis of the reception strength on the electrode toward which the discrepancy has taken place, the magnitude of the discrepancy. The x coordinate of the pen tip 10*a* is determined on the basis of the result thereof. The sensor controller 4 successively decides the presence or absence of discrepancy, the direction of discrepancy, and the magnitude of discrepancy in this manner and detects the x coordinate of the pen tip 10*a* as a result of these decisions.

It is difficult for the sensor controller 4 to determine the x coordinate by such a position detection method in the case where the maximum reception strength is observed on the outer electrode 5*xa*. The reason for this is that it is difficult to decide the direction of discrepancy because of the absence of the other linear electrode 5*x* on one side of the outer electrode 5*xa*. For this reason, the sensor controller 4 is configured to consider that the direction in which the inner electrode 5*x*-1 exists is the direction of discrepancy in the case where the maximum reception strength is observed on the outer electrode 5*xa*. It is difficult to detect the x coordinate on the outside from the center line of the outer electrode 5*xa* (on the side where there is no adjacent linear electrode 5*x*) by configuring the sensor controller 4 in this manner alone. Therefore, the arrangement of the plurality of linear electrodes 5*x* is determined such that the center line of the outer electrode 5*xa* in the x direction overlaps (i.e., matches) or is located outside the outer periphery Aa of the active region A. The inventor of the present application calls such an arrangement method of linear electrodes an "active region outer periphery covering scheme." The same is true for the outer electrode 5*xb* at the edge on the opposite side and the outer electrodes 5*ya* and 5*yb* of the plurality of linear electrodes 5*y*.

The active region outer periphery covering scheme suitably detects coordinates up to the edges of the active region A without coordinate swaying. On the other hand, it is necessary to arrange linear electrodes outside the active region A, thus leading to a larger area of the portion of the sensor panel 5 provided outside the active region A. This may constitute a factor that hinders bezel slimming, an ongoing trend in recent years. The present embodiment provides the sensor panel 5 that solves such a problem and realizes bezel slimming in the tablet electronic equipment 1.

Referring back to FIGS. 1 to 3, the sensor controller 4 is configured to report, to the host controller 2, the coordinates indicating the pointing positions of the active pen 10 and the user's finger detected as described above and a variety of types of data included in the data signal received from the active pen 10. The sensor controller 4 is configured to acquire, on the basis of pen pressure data received from the active pen 10, pen lowering information indicating the coming of the active pen 10 into contact with the touch surface and pen raising information indicating the detachment of the active pen 10 from the touch surface and report these pieces of information to the host controller 2 at their respective timings.

In response to input of the coordinates from the sensor controller 4, the host controller 2 at least displays a pointer or generates ink data. Of these, the display of a pointer is achieved by displaying a given pointer image at the position corresponding to the input coordinates in the active region A of the display panel 3.

Ink data includes control points and curve data. Each of the control points includes one of a plurality of sets of coordinates sequentially supplied from the sensor controller 4. Curve data is obtained by interpolating the control points with a given interpolation curve. The host controller 2 begins the generation of ink data regarding the user's finger when the coordinate input starts and terminates the generation of ink data when the coordinate input ends. The host controller 2 begins the generation of ink data regarding the active pen 10 when pen lowering information is input and terminates the generation of ink data when pen raising information is input. When ink data regarding the active pen 10 is generated, the host controller 2 controls the curve data width and/or transparency included in the ink data on the basis of pen pressure data received from the active pen 10 and other data. The host controller 2 performs rendering on the generated ink data, causes the rendered data to be displayed on the display panel 3, and stores the generated ink data in its own memory.

The basic configuration of the electronic equipment 1 has been described so far. A description will be given next of the characteristic portion of the sensor panel 5 according to the present technology. In the description given below, the background technology will be described first with reference to the drawings, and then the characteristic portion of the sensor panel 5 according to the present technology will be described in detail.

FIG. 11 is a schematic enlarged view of part of the sensor panel 5 according to the background technology of the present technology. FIG. 12 is a schematic cross-sectional view of the electronic equipment 1 corresponding to line C-C illustrated in FIG. 11.

As illustrated in FIGS. 11 and 12, in the sensor panel 5 according to the background technology, the width of each of the plurality of linear electrodes 5*x* in the x direction and the width of each of the plurality of linear electrodes 5*y* in the y direction are both a fixed value W1 (e.g., 4 mm). For example, therefore, in the case where the arrangement of the plurality of linear electrodes 5*x* is determined such that the center line of the outer electrode 5*xa* in the x direction overlaps the outer periphery Aa of the active region A, of the width W1 of the outer electrode 5*xa*, a width WP that sticks out of the active region A is equal to W1/2 (e.g., 2 mm). The same is true for the other outer electrodes 5*xb*, 5*ya*, and 5*yb*.

However, if the outer electrodes 5*xa*, 5*xb*, 5*ya*, and 5*yb* are allowed to stick out of the active region A by as much as W1/2, the area of the portion of the sensor panel 5 provided outside the active region A may increase. This hinders bezel slimming in the electronic equipment 1, an ongoing trend in recent years, which is the reason why improvement may be needed. The sensor panel 5 according to the present embodiment was devised in consideration of the above, and the reduction in area of the portion of the sensor panel 5 provided outside the active region A is realized as compared to the background technology, thereby realizing bezel slimming in the electronic equipment 1.

A detailed description will be given below of the characteristic portion of the sensor panel 5 according to the present technology with reference to FIG. 2 again.

In the sensor panel 5 according to the present embodiment, the width of each of the inner electrodes 5x and 5y is the fixed value W1 as with the sensor panel 5 illustrated in FIGS. 11 and 12. The width of each of the outer electrodes 5xa, 5xb, 5ya, and 5yb is a fixed value W2 (<W1) which is smaller than the fixed value W1. Therefore, for example, in the case where the arrangement of the plurality of linear electrodes 5x is determined such that the center line of the outer electrode 5xa in the x direction overlaps the outer periphery Aa of the active region A, of the width W2 of the outer electrode 5xa, a width WP that sticks out of the active region A is equal to W2/2. The same is true for the other outer electrodes 5xb, 5ya, and 5yb.

W2/2 is a value smaller than W1/2. Therefore, it may be said that the sensor panel 5 according to the present embodiment contributes, of each of the outer electrodes 5xa, 5xb, 5ya, and 5yb, to a reduced width of the portion provided outside the active region A as compared to the background technology illustrated in FIGS. 11 and 12.

As described above, the sensor panel 5 according to the present embodiment contributes, at least for one of the outer electrodes 5xa, 5xb, 5ya, and 5yb, to a reduced width of the portion provided outside the active region A. Therefore, the area of the portion of the sensor panel 5 provided outside the active region A may be reduced, thereby realizing bezel slimming in the tablet electronic equipment 1.

Figure 5:
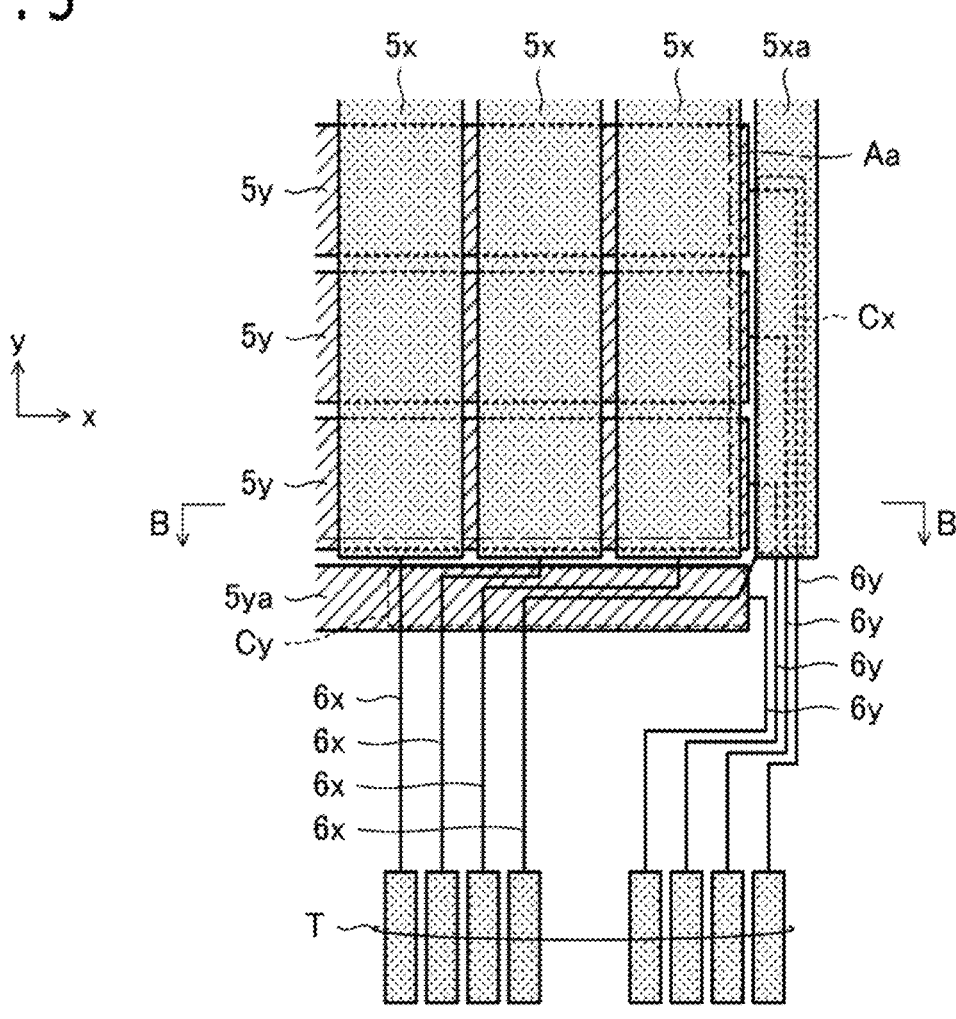
FIG. 5 is a schematic enlarged view of part of the sensor panel 5 according to a second embodiment of the present disclosure.
Figure 6:
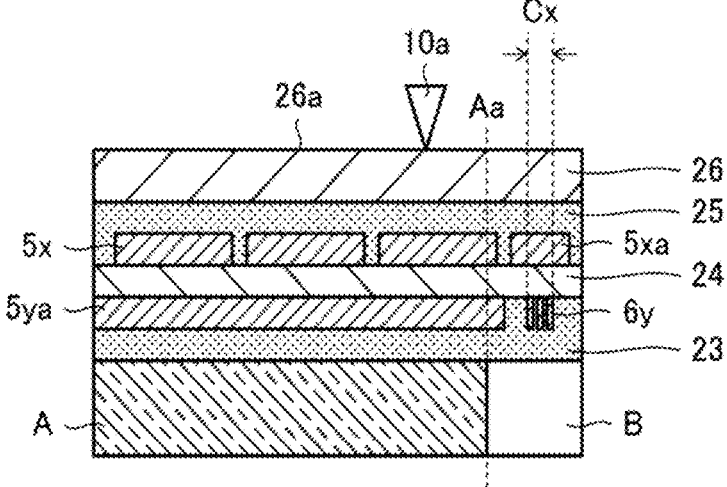
FIG. 6 is a schematic cross-sectional view of the electronic equipment 1 corresponding to line B-B illustrated in FIG. 5.

A description will be given next of a second embodiment of the present technology. FIG. 5 is a schematic enlarged view of part of the sensor panel 5 according to the second embodiment of the present technology. FIG. 6 is a schematic cross-sectional view of the electronic equipment 1 corresponding to line B-B illustrated in FIG. 5.

The present embodiment differs from the first embodiment in that at least one of the outer electrodes 5xa and 5xb is arranged to overlap at least some of the plurality of wires 6y and that at least one of the outer electrodes 5ya and 5yb is arranged to overlap at least some of the plurality of wires 6x. Because the present embodiment is the same as the first embodiment in all other respects, the same components as in the first embodiment will be denoted by the same reference numerals, and the present embodiment will be described with focus on the differences from the first embodiment.

As illustrated in FIGS. 5 and 6, the outer electrode 5xa is arranged to have a cover section Cx (first cover section) that covers at least some of the plurality of wires 6y (preferably two or more). Although not illustrated, the same is true for the outer electrode 5xb. As illustrated in FIG. 5, the outer electrode 5ya is arranged to have a cover section Cy (second cover section) that covers at least some of the plurality of wires 6x (preferably two or more). The outer electrode 5yb may not have a cover section because there is no wire 6x in the corresponding region as may be understood from FIG. 1. The width of each of the outer electrodes 5xa, 5xb, 5ya, and 5yb in the present embodiment is W2 which is smaller than the width W1 of each of the inner electrodes 5x and 5y as with the first embodiment.

In the present embodiment, at least one of the outer electrodes 5xa, 5xb, 5ya, and 5yb may be arranged to overlap the wires 6x and 6y, thereby contributing to a reduced area of the portion of the sensor panel 5 provided outside the active region A. Therefore, bezel slimming in the tablet electronic equipment 1 may also be achieved by the present embodiment.

The present embodiment also offers an additional advantageous effect in that because the linear electrodes 5x and 5y are arranged in the majority of a region inside the bezel region, the active pen 10 located inside the bezel region may receive the above uplink signal.

Figure 7:
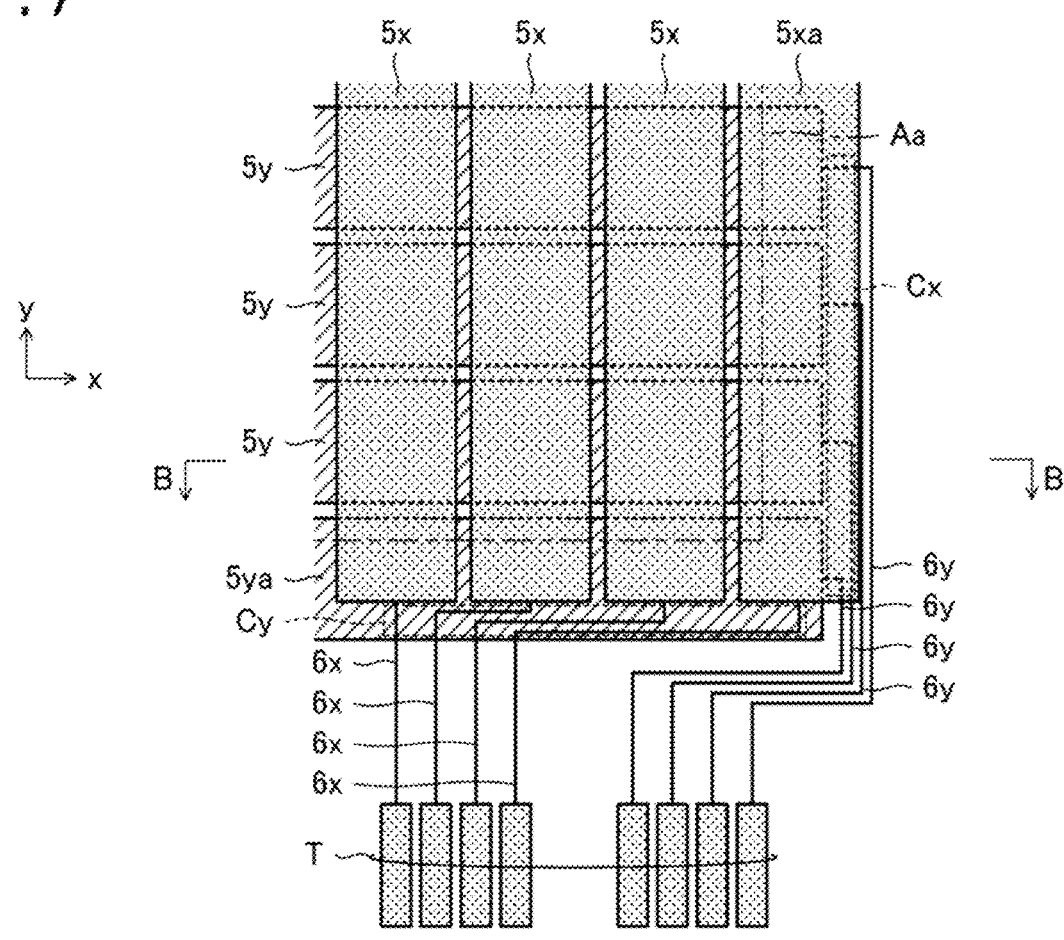
FIG. 7 is a schematic enlarged view of part of the sensor panel 5 according to a first modification example of the second embodiment of the present disclosure.

FIG. 7 is a schematic enlarged view of part of the sensor panel 5 according to a first modification example of the present embodiment. In the present embodiment, the width of each of the outer electrodes 5xa, 5xb, 5ya, and 5yb is W2 as with the first embodiment. In the present modification example, however, the width of each of the outer electrodes 5xa, 5xb, 5ya, and 5yb is W1 which is the same as that of each of the inner electrodes 5x and 5y. By doing so, the advantageous effect of reducing the area of the portion of the sensor panel 5 provided outside the active region A may be achieved, thereby realizing bezel slimming in the tablet electronic equipment 1.

A different problem may arise in the present embodiment. For this reason, this problem and the configuration of the sensor panel 5 for solving the problem will be described below.

Figure 8:
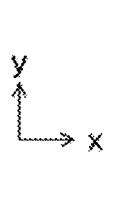
FIG. 8 is a diagram describing a problem that may arise in the sensor panel 5 according to the second embodiment of the present disclosure.
Figure 8:
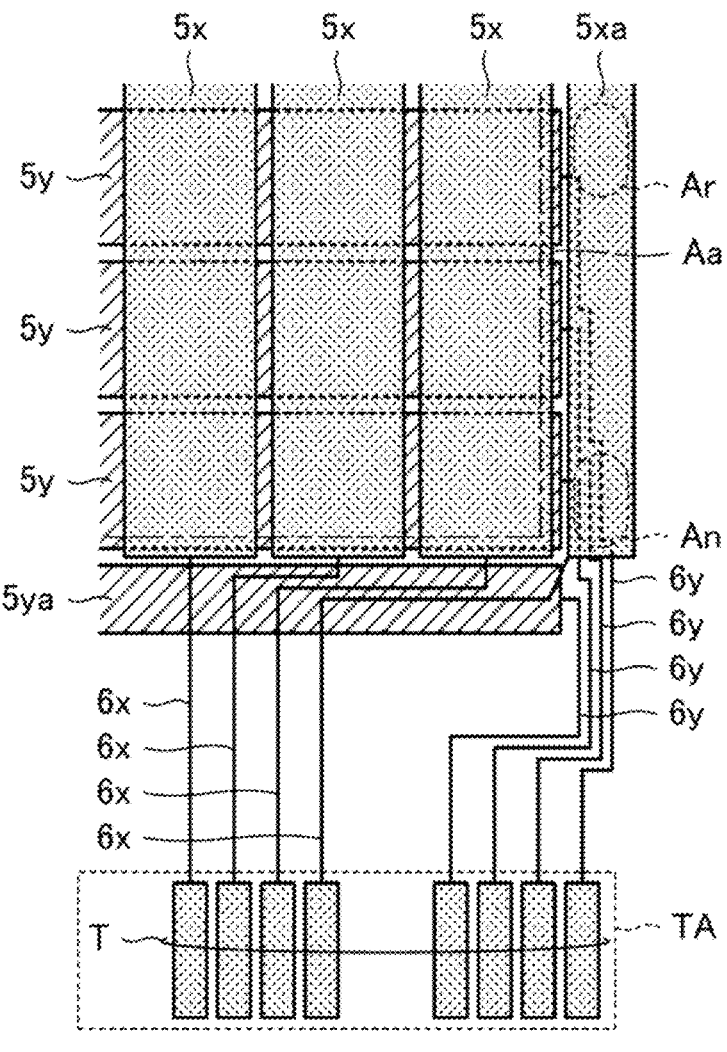

FIG. 8 is a diagram describing the problem that may arise in the sensor panel 5 according to the present embodiment. As described above, the plurality of FPC connection terminals T are arranged side by side along one side of the rectangular sensor panel 5 parallel to the x direction (refer to FIG. 1). As a result, of the region overlapping the outer electrode 5xa, the density of the wires 6y is different between a far region Ar that is relatively far from the region (hereinafter referred to as a terminal region TA) where the plurality of FPC connection terminals T are arranged and a close region An that is relatively close to the terminal region TA. This gives rise to a difference in pen signal reception strength between the regions. In the far region Ar, parasitic capacitance that occurs between it and the wires 6y is smaller than in the close region An, causing a pen signal to be received with higher strength.

In the presence of a difference in pen signal reception strength between the far region Ar and the close region An, the x coordinates calculated in the two regions differ from each other. Even if the pen tip of the active pen 10 is actually located at the same position as viewed in the x direction, a more outer x coordinate is detected near the far region Ar than near the close region An. Such a difference in the calculated x coordinate between the far region Ar and the close region An is not desirable, and improvement is needed.

Figures 9A, 9B, 9C:
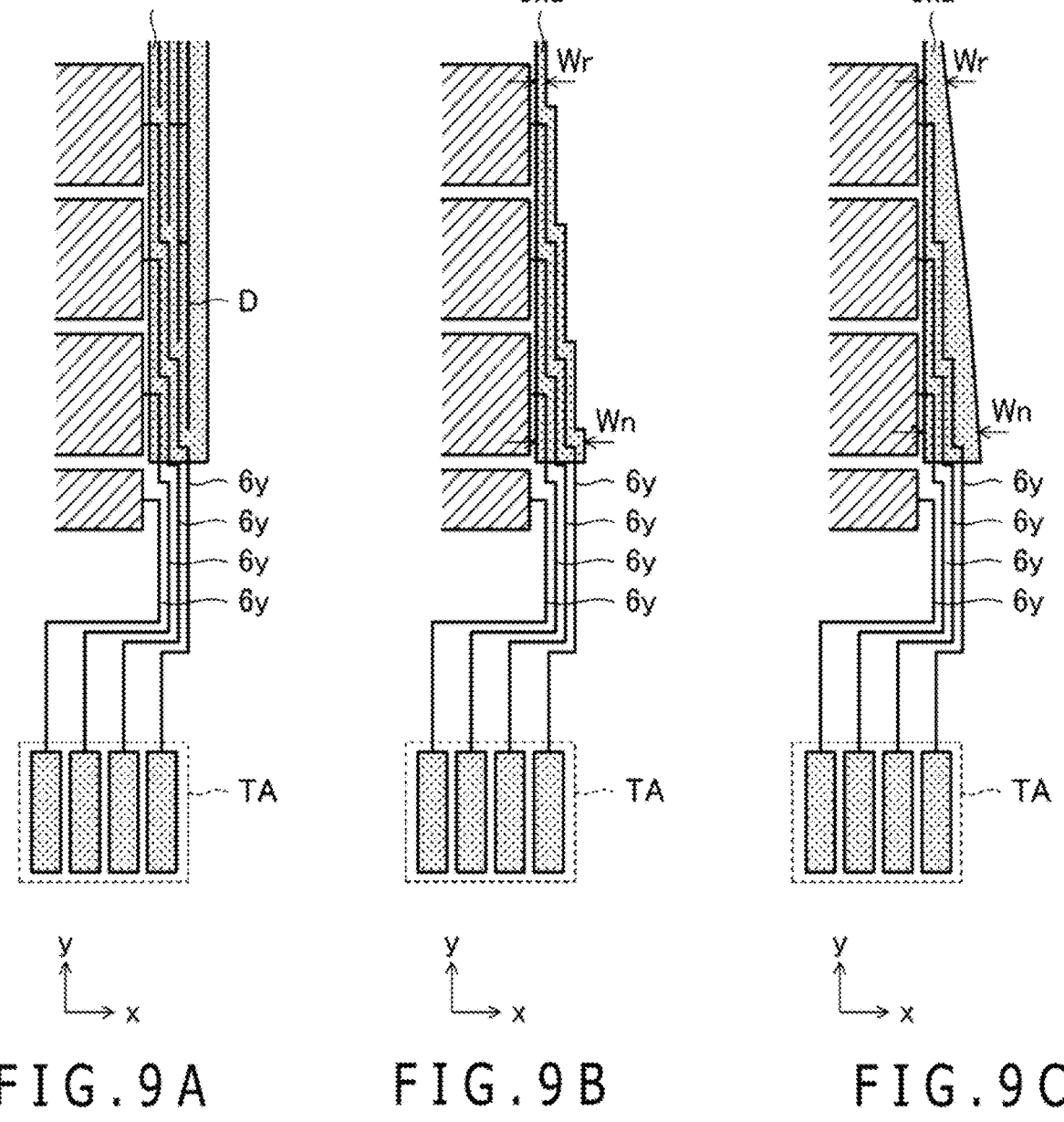
FIGS. 9A to 9C are schematic enlarged views of part of the sensor panel 5 according to second to fourth modification examples of the second embodiment of the present disclosure.

Each of FIGS. 9A to 9C is a schematic enlarged view of part of the sensor panel 5 according to second to fourth modification examples of the second embodiment of the present technology. Each of these sensor panels 5 includes a configuration for ensuring that no difference arises in the calculated coordinate between the far area Ar and the close area An. The linear electrodes 5x other than the outer electrode 5xa are omitted in these figures. A detailed description will be given below of these modification examples one at a time.

The sensor panel 5 according to the second modification example illustrated in FIG. 9A includes dummy wires D that are arranged to overlap the outer electrode 5xa. The dummy wires D are provided in the same layer as the plurality of wires 6y in such a manner as not to be connected to any of the plurality of wires 6x and 6y, and the lower the density of the wires $6y$, the more densely the dummy wires D are arranged. Ground potential is supplied to the dummy wires D from the sensor controller 4 as with the above guard wires LG.

The present modification example evens out the magnitude of parasitic capacitance that occurs between the outer electrode $5xa$ and its overlapping wires between the far area Ar and the close area An. This evens out the pen signal reception strength, thereby ensuring that no difference arises in the calculated x coordinate between the far area Ar and the close area An.

In the sensor panels 5 according to the third and fourth modification examples illustrated in FIGS. 9B and 9C, the outer electrode $5xa$ is formed such that a width Wr in the x direction in the far region Ar is smaller than a width Wn in the x direction in the close region An. The difference between the third and fourth modification examples is that while the outer electrode $5xa$ becomes thinner in steps in accordance with the number of wires $6y$ in the third modification example, the outer electrode $5xa$ becomes thinner in accordance with the distance from the terminal region TA in the fourth modification example.

Both the third and fourth modification examples even out the magnitude of parasitic capacitance that occurs between the outer electrode $5xa$ and its overlapping wires between the far area Ar and the close area An. This evens out the pen signal reception strength, thereby ensuring that no difference arises in the calculated x coordinate between the far area Ar and the close area An.

Although the second to fourth modification examples have been described with focus on the outer electrode $5xa$, these modification examples are similarly applicable to the outer electrodes $5xb$ and $5ya$. There is no need to apply these modification examples to the outer electrode $5yb$ because there is no wire $6x$ that is arranged in an overlapping manner as may be understood from FIG. 1. In the case where there is a need to even out the pen signal reception strength between the outer electrodes $5ya$ and $5yb$, the dummy wires D may be provided for the outer electrode $5yb$, and the outer electrode $5yb$ may be formed thinner than the outer electrode $5ya$.

The difference in coordinate between the different regions occurs only in part of the active region A. Therefore, the second embodiment may be used depending on the coordinate accuracy required rather than applying one of the second to fourth modification examples. The specific extent of the difference in the calculated x coordinate between the far region Ar and the close region An is determined when the configuration of the sensor panel 5 is determined. Therefore, the difference in the calculated x coordinate may be dealt with by incorporating a correction process into the coordinate calculation process of the sensor controller 4 rather than correcting the physical configuration as in the second to fourth modification examples.

A description will be given next of a third embodiment of the present technology. FIG. 10 is a schematic enlarged view of part of the sensor panel 5 according to the third embodiment of the present technology. In the present embodiment, a description will be given of a configuration that may be used in the case where each of the plurality of linear electrodes $5x$ and $5y$ includes a mesh-shaped conductor. The overall configuration of the electronic equipment 1 is the same as that described in the first embodiment except that the sensor panel 5 has the configuration illustrated in FIGS. 11 and 12. In the description given below, therefore, the same components as in the first embodiment will be denoted by the same reference numerals, and the third embodiment will be described with focus on the differences from the first embodiment.

FIG. 10 specifically illustrates mesh-shaped conductors included in the plurality of linear electrodes $5x$. Although each of the plurality of linear electrodes $5y$ is similarly a mesh-shaped conductor, they are not drawn to avoid complexity of the drawing.

As illustrated in FIG. 10, in the present embodiment, the outer electrode $5xa$ includes a mesh-shaped conductor that is formed such that the mesh density is higher outside the active region A than inside the active region A. More specifically, the outer electrode $5xa$ is preferably configured such that the mesh density increases gradually or in steps from inside the active region A toward outside the active region A. Although not illustrated, the same is true for the outer electrodes $5xb$, $5ya$, and $5yb$.

In the present embodiment, a pen signal strength distribution near the outer electrode $5xa$ may be moved more outward than in the case where the outer electrode $5xa$ includes a uniform mesh-shaped conductor or a uniform plate-shaped conductor. As a result, the sensor controller 4 may suitably detect the x coordinate further beyond the center line of the outer electrode $5xa$ in the x direction, thereby reducing the width WP of the portion of the outer electrode $5xa$ provided outside the active region A to less than W1/2 as illustrated in FIG. 10. This means that the active region A may be spread more outward than in the background technology. Therefore, it may be said that the present technology realizes bezel slimming in the tablet electronic equipment 1 as in the first and second embodiments.

The third embodiment is applicable to an outer electrode which is not a mesh electrode. The outer electrode need only be configured such that a coupling capacitance formed between the electrode provided in the pen tip $10a$ of the active pen 10 and the outer electrode is larger in the case where the pen tip $10a$ is located outside the active region A than in the case where the pen tip $10a$ is located inside the active region A.

Although preferred embodiments of the present technology have been described so far, the present technology is not restricted in any way by these embodiments, and it is a matter of course that the present technology may be carried out in various ways without departing from the gist of the present technology.

For example, the sensor panel may have linear electrodes further outside the outer electrodes. Such linear electrodes are used, for example, to detect the presence of the active pen inside the bezel region. In this case, the term "outer electrodes" in the present technology refers to, of the plurality of linear electrodes used to detect coordinates in the active region, those that are located at the outermost edges.

The outer electrodes may all be located outside the active region. The sensor panel 5 described in the second embodiment is an example of a sensor panel having outer electrodes configured in that manner.

What is claimed is:

1. An integrated circuit for an electronic device that includes a sensor panel overlaid on a display device and, the integrated circuit comprising:

a processor and a memory storing a program that, when executed by the processor, causes the integrated circuit to determine a position of an active pen at least within an active area of the display device based on a signal from the active pen, wherein the sensor panel includes:

a plurality of first electrodes each extending in a first direction and arranged side by side in a second direction different from the first direction, wherein the first electrodes, in operation, are connected to the integrated circuit by different first routing lines; and a plurality of second electrodes each extending in the second direction and arranged side by side in the first direction, wherein the second electrodes, in operation, are connected to the integrated circuit by different second routing lines;

wherein the first electrodes include a first outer electrode and a second outer electrode positioned at opposite ends of the electronic device and arranged at positions covering an outer periphery of the active area of the display device, and a plurality of first inner electrodes between the first outer electrode and the second outer electrode, wherein at least one of the first outer electrode or the second outer electrode is arranged so that a center position thereof in the second direction overlaps with the outer periphery or is located outside the outer periphery, wherein a width in the second direction of at least one of the first outer electrode or the second outer electrode is smaller than a width in the second direction of each of the plurality of first inner electrodes, wherein the program, when executed by the processor, causes the integrated circuit to determine the position of the active pen based on a reception strength of the signal from the active pen at the first outer electrode, wherein the program, when executed by the processor, causes the integrated circuit to determine the position of the active pen based on both the reception strength of the signal from the active pen at a first one of the plurality of first inner electrodes that is adjacent to the first outer electrode and the reception strength of the signal from the active pen at the first outer electrode, and wherein, when the first one of the plurality of first inner electrodes has a maximum reception strength of the signal from the active pen among the plurality of first electrodes, the program, when executed by the processor, causes the integrated circuit to determine the position of the active pen based on a ratio between the reception strength of the signal from the active pen at a second one of the plurality of first inner electrodes that is adjacent to the first one of the plurality of first inner electrodes on an opposite side of the first outer electrode, and the reception strength of the signal from the active pen at the first outer electrode.

2. The integrated circuit according to claim 1, wherein the program, when executed by the processor, causes the integrated circuit to determine the position of the active pen based on both a reception strength of the signal from the active pen at one or more of the plurality of first inner electrodes and the reception strength of the signal from the active pen at the first outer electrode.

3. The integrated circuit according to claim 1, wherein, when the first outer electrode has a maximum reception strength of the signal from the active pen among the plurality of first electrodes, the program, when executed by the processor, causes the integrated circuit to determine the position of the active pen based on the reception strength of the signal from the active pen at the first one of the plurality of first electrodes.

* * * * *